United States Patent
Kiehne et al.

(10) Patent No.: US 7,147,925 B2
(45) Date of Patent: Dec. 12, 2006

(54) WHITE, STEAM-STERILIZABLE AND EXTRUSION-COATABLE POLYESTER FILM

(75) Inventors: Thorsten Kiehne, Shiga (JP); Herbert Peiffer, Mainz (DE); Gottfried Hilkert, Saulheim (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 11/108,530

(22) Filed: Apr. 18, 2005

(65) Prior Publication Data

US 2005/0238900 A1    Oct. 27, 2005

(30) Foreign Application Priority Data

Apr. 27, 2004  (DE)  .................. 10 2004 020 620
Jul. 16, 2004   (DE)  .................. 10 2004 034 379

(51) Int. Cl.
| | |
|---|---|
| B32B 27/06 | (2006.01) |
| B32B 27/18 | (2006.01) |
| B32B 27/20 | (2006.01) |
| B32B 27/36 | (2006.01) |
| B29C 55/12 | (2006.01) |

(52) U.S. Cl. ................ 428/447; 428/332; 428/339; 428/343; 428/355 R; 428/446; 428/480; 428/910; 264/288.4; 264/289.6; 264/290.2

(58) Field of Classification Search .............. None
See application file for complete search history.

(56) References Cited

U.S. PATENT DOCUMENTS

| | | | |
|---|---|---|---|
| 2,627,088 A | 2/1953 | Alles et al. ............... 18/47.5 |
| 2,698,240 A | 12/1954 | Alles et al. ............... 95/9 |
| 4,214,035 A | 7/1980 | Heberger ............... 428/340 |
| 4,898,786 A * | 2/1990 | Swofford ............... 428/480 |
| 4,939,035 A | 7/1990 | Swofford ............... 428/341 |
| 5,064,722 A * | 11/1991 | Swofford et al. ........... 428/447 |
| 5,082,738 A | 1/1992 | Swofford ............... 428/447 |
| 2004/0081840 A1* | 4/2004 | Kiehne et al. ............. 428/482 |

FOREIGN PATENT DOCUMENTS

| | | |
|---|---|---|
| EP | 0 359 017 A2 | 3/1990 |
| EP | 0 605 130 A1 | 7/1994 |
| EP | 605 130 A1 | 7/1994 |
| EP | 0 687 636 A1 | 12/1995 |
| EP | 1 176 004 A1 | 1/2002 |
| GB | 1 411 564 | 10/1975 |

OTHER PUBLICATIONS

Schimtz, Peter et al., "Films." Ullmann's Encyclopedia of Industrial Chemistry, 5th Ed., vol. A11 (1988), pp. 85-95, 105-106, 108-110.*
Werner, Eberhard et al., "Polyester, Films." Encyclopedia of Polymer Science and Engineering, vol. 12 (1988), pp. 193-216.*

* cited by examiner

*Primary Examiner*—Vivian Chen
(74) *Attorney, Agent, or Firm*—ProPat L.L.C.

(57) ABSTRACT

The invention relates to a single- or multilayer, white, biaxially oriented polyester film. Films of the invention are formed from thermoplastic polyester and are coated on at least one side with a water-soluble adhesion-promoting layer that includes a hydrolyzed amino-functional silane. The invention further relates to the use of the film and to a process for its production.

21 Claims, 2 Drawing Sheets

WHITE, STEAM-STERILIZABLE AND EXTRUSION-COATABLE POLYESTER FILM

FIELD OF THE INVENTION

The invention relates to a single- or multilayer, white, biaxially oriented polyester film, comprising a thermoplastic polyester and coated on at least one side with a water-soluble adhesion-promoting layer comprised of a hydrolyzed amino-functional silane. The invention further relates to a process for the production of the film, and its use.

BACKGROUND OF THE INVENTION

An example of a known application for white, biaxially oriented polyester films is lids for yoghurt cups. In that application they are used as an alternative to aluminum foils. These lids are printed and embossed on the outer side and on the inner side are provided with a coating or hot-melt, which adhesive-bonds the lids to the cups. To improve the shelf life of the yoghurt, sufficient protection from light has to be provided not only by the cup but also by the lid. This is generally achieved via coloring of the lids with suitable pigments. For specific applications, it is also desirable for the complete lid or the complete system to be sterilizable, but at least steam-sterilizable. Another requirement placed upon the lid film is that when it is peeled from the cup it is subject neither to delamination nor tearing nor tear-propagation. The properties required for this are present in the film by virtue of the biaxial stretching process and by virtue of appropriately high thickness. The mechanical properties of the lid (stiffness, puncture resistance, tear-propagation resistance) improve more than proportionally with the thickness of the film. Polyester films of thickness from 30 to 90 μm have proven successful for the yoghurt-lid application. The thickness of the film cannot be increased without limit, because materials costs rise with thickness and sealing cycle times deteriorate, and this is undesirable for economic reasons. A trend toward lower thicknesses is observable.

Lids comprised of polyester films generally have a number of advantages:

The lid has a smooth, high-gloss surface which guarantees excellent color reproduction and therefore has high visual appeal.

When compared with conventional material, the puncture resistance of the film is higher by up to 700%, and this gives substantially greater product protection.

The lid is easy to open without retention of lid fragments on the cup, as is found with conventional materials, e.g. aluminum foils. This property is particularly valued by the consumer.

Complete separation of cup and lid is highly advantageous for recyclability of the two materials. The lid film is comprised of thermoplastic polyester which has excellent recycling properties. The product is therefore environmentally friendly.

The polyester film moreover gives excellent processing for the lid application because it has high stiffness and good slip.

The lid is moreover absolutely metal-free. This guarantees a very high level of safety during metal detection, the use of which is constantly increasing in food production. The proportion of any metallic constituents which may be present in the contents can therefore be determined with high precision using that method.

Attempts to equip a conventional transparent film with the desired combination of properties via pigment addition has failed. The film delaminated on peeling from the yoghurt cup.

Processors use certain criteria for the performance of the films during further processing to give yoghurt cups. The test variables usually used in the production of lid films are the R value and the $e_{max}$ ratio. The R value can be given as a measure of orientation and is measured directly after production of the film in the middle of the film web. The $e_{max}$ value ratio describes the distribution of orientation across the width of the web (known as bow) and is likewise measured during production of the film, but at discrete intervals across the entire width of the film web (cf. under test methods). In the case of transparent films (not the present white films), the R values are in the range from 45 to 48 and the $e_{max}$ ratio values are in the range from 2.6 to 2.8. Studies have shown that these values cannot be extended from transparent films to the present white films. If the abovementioned values are maintained for white film, the result is generally delamination of the film. The film delaminates within itself, and tears in the direction of the thickness; the tear damages the structure of the film and propagates within the film.

The properties mentioned above are not achieved in their entirety by films known in the prior art.

For example, EP-A-0 605 130 describes a multilayer film for the lid application which has at least one opaque layer and at least one transparent layer comprised of crystalline polyester. The film is also described via a deformation index, which is to be greater than or equal to 2.5%. In addition, the film can be coated with certain substances, improving adhesion to printing inks and/or other inks. The specification gives no information concerning the R values and the $e_{max}$ ratio of the film. A film produced to EP-A-0 605 130 (Example 1, longitudinal stretching temperature about 80° C., stretching ratio for longitudinal stretching 3.3) delaminated, and moreover exhibited poor processing performance because the film curled after stamping-out to give the lids.

For economic reasons it is necessary to achieve a permanent reduction in the costs for production of the lid film. A significant lever here is the thickness of the film. Lower lid thickness is directly associated with a reduction in materials costs and leads to higher filling speeds, due to low sealing cycle times. However, the thickness of the lid cannot be reduced as desired, because that leads to problems in processing and in handling. Lids comprised of polyester film with excessively low thickness tend to tear and to delaminate. The result is loss of product safety and of the advantage of 100% separation between lid and cup. The more pigments, and the greater the size of the pigments, incorporated into the polyester film, the greater the risk of tearing and of delamination of the lid. Pigments, in particular relatively coarse pigments, form points of weakness within the film at which breakdown of the film begins on peeling from the cup.

It is therefore an object of the invention to provide a white, biaxially oriented polyester film, in particular for the lid application, which has better properties than the polyester films established within the market, and does not have the disadvantages of the prior art.

SUMMARY OF ADVANTAGEOUS EMBODIMENTS

The object is achieved via a single- or multilayer, white, biaxially oriented polyester film, comprising a thermoplastic polyester and coated on at least one side, wherein a) the R value of the film is smaller than 43 daN/mm$^2$,
b) the $e_{max}$ ratio of the film is smaller than 2.5, and
c) the coating on one or both surface(s) of the film is an adhesion-promoting, steam-sterilization-resistant layer comprised of a hydrolyzed amino-functional silane.

Surprisingly, it has been found that the use of an adhesion-promoting layer comprised of a hydrolyzed amino-functional silane and applied in the form of an aqueous dispersion to the film achieves the desired combination of good adhesion to inks, primer, adhesive, metallic and ceramic layers with sterilizability.

The film of the invention has the following combination of properties:
  capability for cost-effective production, good winding capability, good processibility;
  good adhesion of at least one side of the film to inks, adhesives, sealing lacquers;
  steam-sterilizable, i.e. even after steam-sterilization, the film has good adhesion to inks, adhesive, primer, and metallic and ceramic layers;
  very good peel-from-cup performance, no delamination, no tearing and no tear-propagation;
  good optical properties, in particular even when recycled identical film material is added during film production, and good light-stabilization properties.

Application of metallic or ceramic layers to the film can, by way of example, markedly improve the barrier action of the lid with respect to permeability to oxygen, flavor, or water vapor.

The invention also provides a process for improving the adhesion of the film to inks, adhesives and primers, and to metallic and ceramic layers after steam sterilization. The invention further provides, by virtue of the adhesion-promoting coating, a process by which the film is prepared for accepting a subsequent extrusion coating with other polymers. However, this does not cause the film to lose its other advantageous properties, e.g. good optical properties. This is an important point, especially for possible use, during production of the film, of recycled identical film material which inevitably comprises the coating material.

DETAILED DECRIPTION OF THE INVENTION

The inventive film generally has a single-layer structure and is then comprised of the base layer B and of the adhesion-promoting layer which is applied in the form of a solution or in the form of an aqueous dispersion to the film. It can also, however, have a multilayer structure. In this case it has proven advantageous to design the layer structure of the film symmetrically. Examples of advantageous embodiments of multilayer films are ABA or ACBCA, where A is the outward-facing outer layers, C is the intermediate layers, and B is the base layer. In the case of the multilayer films, the adhesion-promoting layer is always on the outward-facing side of the film.

The base layer B of the film is comprised of at least 80%, preferably at least 85% by weight, and in particular at least 90% by weight, of a thermoplastic polyester. Polyesters suitable for this are those made from ethylene glycol and terephthalic acid (=polyethylene terephthalate, PET), from ethylene glycol and naphthalene-2,6-dicarboxylic acid (=polyethylene 2,6-naphthalate PEN), from 1,4-bishydroxymethyl-cyclohexane and terephthalic acid (=poly-1,4-cyclohexanedimethylene terephthalate, PCDT), and also from ethylene glycol, naphthalene-2,6-dicarboxylic acid and biphenyl-4,4'-dicarboxylic acid (=polyethylene 2,6-naphthalate bibenzoate, PENBB). Particular preference is given to polyesters comprised of at least 90 mol %, preferably at least 95 mol %, of ethylene glycol units and terephthalic acid units or of ethylene glycol units and naphthalene-2,6-dicarboxylic acid units. The remaining monomer units are derived from other aliphatic, cycloaliphatic, or aromatic diols and/or other dicarboxylic acids. The base layer is preferably comprised of PET. Examples of other suitable aliphatic diols are diethylene glycol, triethylene glycol, aliphatic glycols of the formula HO—$(CH_2)_n$—OH, where n is an integer from 3 to 6 (in particular propane-1,3-diol, butane-1,4-diol, pentane-1,5-diol, and hexane-1,6-diol), or branched aliphatic glycols having up to 6 carbon atoms. Among the cycloaliphatic diols, mention should be made of cyclohexanediols (in particular cyclohexane-1,4-diol). Examples of other suitable aromatic diols are those of the formula HO—$C_6H_4$—X—$C_6H_4$—OH where X is —$CH_2$—, —$C(CH_3)_2$—, —$C(CF_3)_2$—, —O—, —S— or —$SO_2$—. Other suitable bisphenols are those of the formula HO—$C_6H_4$—$C_6H_4$—OH.

Preferred other aromatic dicarboxylic acids are benzenedicarboxylic acids, naphthalenedicarboxylic acids (such as naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid), or stilbene-x,x'-dicarboxylic acid. Among the cycloaliphatic di-carboxylic acids, mention may be made of cyclohexanedicarboxylic acids (in particular cyclohexane-1,4-dicarboxylic acid). Among the aliphatic dicarboxylic acids, particularly suitable compounds are the ($C_3$–$C_{19}$)alkanediacids, where the alkane moiety may be straight-chain or branched.

The base layer B may comprise, alongside polyesters, other thermoplastic polymers, additives, and pigments. Examples of polymers suitable for this purpose are aliphatic and aromatic polyamides, polyolefins, and cyclic olefin copolymers (COCs). Suitable additives and pigments are described at a later stage below.

By way of example, the polyesters may be prepared by the known transesterification process. The starting materials for this are dicarboxylic esters and diols, which are reacted using the customary transesterification catalysts, such as the salts of zinc, of calcium, of lithium, of magnesium, and of manganese. The intermediates are then polycondensed in the presence of widely used polycondensation catalysts, such as antimony trioxide or titanium salts. The preparation may be carried out just as successfully by the direct esterification process in the presence of polycondensation catalysts. This process starts directly from the dicarboxylic acids and the diols.

The polymers used for any outer layers A present or for any intermediate layers C present may in principle be the same as those described above for the base layer B.

The R value of the film is determined directly after its production, and the specimens required here are removed from the middle of the film web. The $e_{max}$ ratio is likewise determined directly after production of the film, but here the test specimens are removed at defined intervals across the entire width of the film web.

The inventive film is characterized by a low R value. The R value is a measure of the orientation of the film and for the purposes of the present invention replaces the orientation variables Δn or Δp which are otherwise conventional. These can only be measured in the case of a transparent film, but cannot be measured in the case of the present white film.

The R value of the film is measured in the middle of the film web at an angle of 45° to the machine direction (MD) and specifically firstly with right-hand deviation from MD and secondly with left-hand deviation from MD (see test methods). This specification takes into account that yoghurt-lid films are usually peeled from the cup at an angle of 45° from the machine direction.

Operations during lid production (printing, stamping) take place from the roll. The roll direction (=web direction) of the film here corresponds to MD. The method of printing the film web here is such that the lids to be stamped out lie either precisely in MD or precisely in TD (TD=90° from MD). Consequently, the direction of peel of the lid always coincides with 45° from the MD. For this reason it is necessary to determine the R value at 45° from MD.

It has been found that the behavior of the lid with respect to tearing and tear propagation becomes more advantageous or less pronounced as the R value of the film decreases. The tendency of the film to delaminate is then very low. The R value of the film of the present invention is less than 43 daN/mm$^2$, preferably less than 42 daN/mm$^2$, and in particular less than 40 daN/mm$^2$. In contrast to this, the film is otherwise (R value greater than 43 daN/mm$^2$) more susceptible to tearing and delamination. Considerably greater film thickness is then required to compensate for this disadvantage.

The film of the present invention is also characterized by a low $e_{max}$ ratio. The $e_{max}$ ratio is measured at defined intervals across the entire web width of the machine roll. This again takes place at an angle of 45° from MD, and specifically firstly with right-hand deviation from MD and secondly with left-hand deviation from MD (see test method). In the middle of the film web, the $e_{max}$ ratio is approximately one and it generally increases as the edges of the film are approached. The $e_{max}$ ratio describes the properties of the film across the width of the roll, in particular the change in properties in comparison with the middle of the film web. Performance characteristics improve as the $e_{max}$ ratio decreases, i.e. as film properties become more uniform across the width.

The $e_{max}$ ratio of the inventive film is less than 2.5, preferably less than 2.2, and particularly preferably less than 2.0. Otherwise ($e_{max}$ ratio greater than 2.5) the film is more susceptible to tearing and delamination. Greater film thickness is then again required to compensate for this disadvantage, and is not cost-effective.

In order to achieve the abovementioned properties, in particular the desired whiteness of the film, pigments necessary for this purpose are incorporated into the base layer B, but also optionally, alternatively or additionally, into other layers present. Examples of material which may be used are titanium dioxide, calcium carbonate, barium sulfate, zinc sulfide or zinc oxide. It is preferable to use TiO$_2$ as sole colorant pigment. It is preferably added in the form of an extrusion masterbatch (titanium dioxide concentration here being markedly higher than in the biaxially oriented film) to the original polymer. Typical values for TiO$_2$ concentration in the extrusion masterbatch are 50% by weight of titanium dioxide. The titanium dioxide may either be of rutile type or else of anatase type. It is preferable to use titanium dioxide of the rutile type. The grain size of the titanium dioxide is generally from 0.05 to 0.5 μm, preferably from 0.1 to 0.3 μm. By virtue of the pigments incorporated, the film acquires a brilliant white appearance. In order to reach the desired whiteness (>60) and the desired low transparency (<60%), the base layer should have a high filler level. The particle concentration required to achieve the desired low transparency is above 3% by weight, but below 20% by weight, preferably above 4% by weight, but below 18% by weight, and very particularly preferably above 5% by weight, but below 16% by weight, based on the total weight of the layer comprising the same.

It has been found that if, as is preferred, the colorant pigment used is in essence TiO$_2$, the film is less susceptible to tearing and delamination. The addition of the TiO$_2$ preferably by way of masterbatch technology has the advantage that it becomes relatively easy to correct color differences, e.g. via variations in properties of recycled material. If the sole pigment used is TiO$_2$, the film becomes particularly smooth and therefore more glossy, but can possibly have a tendency to block.

Suitable optical brighteners can be added to the base layer and/or to the other layers, to give a further increase in whiteness. Examples of suitable optical brighteners are Hostalux® KS or Eastobrite® OB-1.

The base layer, and also other layers present, may also comprise conventional additives, e.g. stabilizers. They are usually added to the polymer or polymer mixture prior to melting. Examples of stabilizers used are phosphorus compounds, such as phosphoric acid or phosphoric esters.

The thickness of the polyester film of the present invention can vary within wide limits. It is generally from 10 to 120 μm, preferably from 15 to 105 μm, in particular from 20 to 80 μm, the proportion of the base layer, based on the total thickness, preferably being from 50 to 100%.

According to the invention, at least one side of the film has been coated with an aqueous adhesion-promoting dispersion. The thickness of the coating on the finished film is from 5 to 2000 nm, preferably from 10 to 1000 nm, in particular from 20 to 500 nm. The coating is applied in-line, i.e. during the film-production process, advantageously prior to transverse stretching. Particular preference is given to application of the coating by means of the reverse gravure-roll coating process, which can apply the coatings in extremely homogeneous fashion. Preference is likewise given to application of the coating via the Meyer Rod process, which can achieve relatively high coating thicknesses.

The adhesion-promoting layer is comprised of an amino functional silane, which renders the film resistant to steam sterilization (i.e. the laminate comprised, by way of example, of film, coating, adhesive, and/or of applied metallic and ceramic layers, does not delaminate). Furthermore, the silane prepares the film to accept direct extrusion coating with polymers.

The invention therefore also represents a steam-sterilizable laminate, comprised of an oriented polyester film, of an adhesion-promoting layer, and of a directly extruded polymer.

The adhesion-promoting layer, i.e. the silane used for this purpose, has the following formula in the unhydrolyzed state:

in which R$^1$ is a functional group having at least one primary amino group. R$^2$ is a hydrolyzable group, e.g. a short-chain alkoxy group having from 1–8 carbon atoms, an acetoxy group, or a halide. R$^3$ is an unreactive, non-hydrolyzable group, either a short-chain alkyl group having from 1–8 carbon atoms or a phenyl group; in the formula, (a) is greater than or equal to 1; (b) is greater than or equal to 1; (c) is greater than or equal to 0; where a+b+c=4.

After hydrolysis, the silanes are water-soluble or water-dispersible, amino-functional silanes having particularly good water-solubility. It has been found that, even after steam sterilization, the aminosilanes have good adhesion to inks, adhesive, primer, and metallic and ceramic layers, and likewise bring about good adhesion of extrusion-coated polymers to polyester films without any additional adhesion-promoting layer or corona treatment.

By way of example, the amino-functional silane is hydrolyzed in water and applied to one or more surfaces of the oriented polyester, using conventional methods, such as spray-coating or roller-coating. Once the silane coating has been dried, the resultant primed polyester is then steam-sterilizable and receptive to direct extrusion with other polymers. A conventional process may be used for extrusion coating. The cut polyester film with aminosilane coating can be recycled.

Examples of aminosilanes of the formula mentioned are N-2-(aminoethyl)-3-aminopropyltrimethoxysilane, 3-aminopropyltrimethoxysilane, 4-aminobutyltriethoxysilane, 4-aminobutyldimethylmethoxysilane, and p-aminophenyltrimethoxysilane. Preference is given to N-2-(aminoethyl)-3-aminopropyltrimethoxysilane having the following formula:

$H_2N(CH_2)_2NH(CH_2)_3Si(OCH_3)_3$.

In principle, the hydrolyzed aminosilane may be applied at any possible juncture during the production of the film, i.e. prior to or during the stretching process, and can also be applied to the finished film (for example) prior to wind-up.

The hydrolyzed aminosilane intended to form the adhesion-promoting layer is applied to the film in the form of an aqueous solution at a concentration of from 0.2 to 6.0% by weight, based on the unhydrolyzed aminosilane. Up to 0.2% by weight of a weak acid, such as acetic acid, phosphoric acid, or the like is then added in order to facilitate hydrolysis. At least one of the hydrolyzable groups of the silane is hydrolyzed in this process to give a silanol group (SiOH). The preferred concentration of the hydrolyzed aminosilane is from 0.25 to 3.5 percent by weight. The preferred concentration is such as finally to give a target dry application weight of 0.5 mg/m² of the adhesion-promoting layer.

The inventive coating described above has been described in detail in EP-A-0 359 017 (whose United States counterpart is U.S. Pat. No. 4,939,035) both of which are hereby incorporated by way of reference. That specification also gives information concerning other specific combinations of these hydrolyzable aminosilanes, and that information is not repeated here.

The coating may be applied to one or both outward-facing sides of the polyester film; however, it may also be applied only to one side, and the reverse side may be provided with another coating of different structure. This may then be, by way of example, a hot-curing coating comprised of acrylate or methacrylate, as described in U.S. Pat. No. 4,214,035.

The coating formulation may likewise comprise other ingredients, as long as these other ingredients do not reduce the adhesion-promoting properties of the hydrolyzed aminosilane. Among these are relatively small amounts of colloidal silica, of dyes, of pH regulators, wetting agent, or the like.

Cut material coated with the adhesion-promoting layer and produced during film production can be chopped, mixed with virgin polymer, remelted, and extruded to produce oriented films. There is no significant adverse effect here on the physical properties of the film in a film produced with significant amounts of coated recycled material at a proportion of up to about 60%, preferably from 10 to 50% by weight, based in each case on the total weight of the film. Consequently, the film coated with the adhesion-promoting layer provides the film producer with commercial advantages over other coated films. For example, films that are coated with vinylidene-chloride-containing polymers (cf. U.S. Pat. No. 2,627,088 and U.S. Pat. No. 2,698,240) tend to degrade and decolor when they are recycled in the manner described.

One particular advantage of the invention is that the production costs of the inventive film are only insignificantly higher than those for a film comprised of standard polyesters. The processing- and service-related properties of the inventive film are markedly better than those of prior-art films.

The present invention therefore also provides a process for producing the film of the invention. It comprises:

the production of a single- or multilayer film comprised of a base layer B and, if appropriate, outer layer(s) A (and C), via coextrusion and forming of the melts to give flat melt films, coating of the film with the water-soluble, adhesion-promoting, and steam-sterilizable layer (preferably between the first and the second stretching step), biaxial stretching of the film and heat-setting of the stretched film, where the coating takes place prior to, during or after biaxial orientation.

The polymer or polymer mixture for the individual layers is first compressed and plasticized in an extruder. The melt(s) is (are simultaneously) extruded through a flat-film die, and the extruded (multilayer) film is drawn off on one or more take-off rolls, whereupon it cools and solidifies.

The biaxial orientation is generally carried out sequentially. For this, it is preferable to orient first longitudinally (i.e. in machine direction=MD) and then transversely (i.e. perpendicularly to the machine direction=TD). The longitudinal orientation can be carried out with the aid of two rolls running at different speeds corresponding to the desired stretching ratio. For the transverse orientation process, use is generally made of an appropriate tenter frame.

The temperature at which PET can generally be biaxially oriented can vary within a relatively wide range and depends on the desired properties of the film. Longitudinal stretching is generally carried out at from about 80 to 140° C. and transverse stretching at from about 80 to 150° C. The longitudinal stretching ratio $\lambda_{MD}$ here is generally in the range from 2.0:1 to 5:1. The transverse stretching ratio $\lambda_{TD}$ is generally in the range from 2.5:1 to 5.0:1.

Preferably prior to transverse stretching, one or both surfaces of the film is/are coated by known processes with the water-soluble adhesion-promoting and steam-sterilizable layer.

For production of a film with very good peel and delamination performance (delamination of the film during peeling being impermissible) it has proven advantageous for the R value of the film to be smaller than 43 daN/mm² and for the $e_{max}$ ratio to be smaller than 2.5. In this case, the strength of the film in the direction of thickness is so great that there is absolutely no delamination of the film, or tearing of the film or tear-propagation in the film, when the lid is peeled from the cup.

The significant variables affecting the R value and the $e_{max}$ ratio of the film are the process parameters in longitudinal stretching and in transverse stretching, and also the SV value of the polymers used. Among the process parameters are in particular the longitudinal and transverse stretching ratios ($\lambda_{MD}$ and $\lambda_{TD}$), the longitudinal and transverse stretching temperatures ($T_{MD}$ and $T_{TD}$), and the film web speed.

By way of example, if a film plant gives R values and $e_{max}$ ratios which are above the inventive values, it is nevertheless possible to produce films of the invention by increasing the temperatures in longitudinal stretching and in transverse stretching and/or lowering the stretching ratios in longitudinal stretching and in transverse stretching. Conventional values of the parameters mentioned for films not used for yoghurt cup lids are

|  | Longitudinal stretching | Transverse stretching |
| --- | --- | --- |
| Stretching temperatures | from 80 to 118° C. | from 90 to 120° C. |
| Stretching ratios | from 4.2 to 4.8 | from 4.1 to 4.4 |

However, in contrast, in the case of films of the invention, the temperatures and stretching ratios are within the ranges given in the table below.

|  | Longitudinal stretching | Transverse stretching |
| --- | --- | --- |
| Stretching temperatures | from 80 to 130° C. | from 80 to 135° C. |
| Stretching ratios | from 2.5 to 4.0 | from 3.5 to 4.0 |

Further lowering of the stretching ratios is not advantageous, because this can result in undesirable defects apparent in the film. If, by way of example, the longitudinal stretching ratio is lowered below a value of 2.5, the result in the film can sometimes be clearly visible transverse creases.

By way of example, if a film-production machine gives an R value of 50 daN/mm² with the parameter set $\lambda_{MD}$=4.8 and $\lambda_{TD}$=4.0, and longitudinal and transverse stretching temperatures $T_{MD}$=115° C. and $T_{TD}$=90–125° C., an increase in the longitudinal stretching temperature to $T_{MD}$=125° C. or an increase in the transverse stretching temperature to $T_{TD}$=90–135° C., or a reduction in the longitudinal stretching ratio to $\lambda_{MD}$=4.0 or a reduction in the transverse stretching ratio to $\lambda_{TD}$=3.6, gives an R value of 38. Surprisingly, it has been found here that these measures also bring the $e_{max}$ ratio into the inventive range. The web speed of the finished film here is 140 m/min, and the SV value of the film is 730. The temperatures for longitudinal stretching are the roll temperatures and the temperatures for transverse stretching are the film temperatures, measured by means of IR (infrared).

In the heat-setting which follows, the film is kept at a temperature of from about 150 to 250° C. for from about 0.1 to 10 seconds. The film is then wound up in the usual way.

The hydrolyzed aminosilane layer of the present invention in the form of an aqueous coating may be applied in-line in one of the three steps during film production:

in the pre-stretching phase at the point between the take-off roll and the first stretching step, as described in GB Patent No. 1,411,564;

in the intermediate phase at the position between the stretching procedures after the first but prior to the second stretching process, as described in U.S. Pat. No. 4,214,035; or in the post-stretching phase, following biaxial stretching but prior to wind-up of the film.

The heat used for stretching or setting of the film is normally sufficient to evaporate the water or other volatile substances and dry the adhesion-promoting layer; an additional drying step is needed if the coating is applied after the heating steps described.

In the preferred embodiment, the film is stretched prior to the coating process, first longitudinally. In this preferred embodiment, after longitudinal stretching, the film is coated in any desired form of the prior art. By way of example, the method here may be roll coating, spray coating, or slot coating.

In another preferred embodiment, the polyester film is coated by way of a gravure roll. The monoaxially oriented film may also be subjected to a corona-discharge treatment of the prior art prior to the coating process. The corona treatment weakens the hydrophobic character of the polyester film surface, and this allows better wetting of the surface by the water-based adhesion-promoting layer and consequently improves the adhesion of the adhesion-promoting layer to the film surface.

Steam-sterilizable laminates can also be produced by the known process of extrusion coating, the molten polymer layer being applied continuously to the primed surface of the running film web. Laminates of polyester with polyethylene, with ethylene-vinyl acetate copolymers, with ethylene-methacrylic acid copolymers, with polyvinyl alcohol, with polyvinyl acetate, and with other polymers can easily be produced via extrusion coating.

By way of general indication for achieving the inventive R value and the inventive $e_{max}$ ratio, an advantageous method starts from a parameter set giving a film with non-inventive R values and $e_{max}$ ratios, and either:

increases the MD stretching temperature by $\Delta T$=from 3 to 15 K, preferably by $\Delta T$=from 5 to 12 K and particularly preferably by $\Delta T$=from 7 to 10 K, or decreases the MD stretching ratio by $\Delta\lambda$=from 0.3 to 0.8, preferably by $\Delta\lambda$=from 0.35 to 0.7, and particularly preferably by $\Delta\lambda$=from 0.4 to 0.6, or increases the TD stretching temperature by $\Delta T$=from 4 to 15 K, preferably by $\Delta T$=from 5 to 12K and particularly preferably by $\Delta T$=from 7 to 10 K, or decreases the TD stretching ratio by $\Delta\lambda$=from 0.3 to 0.8, preferably by $\Delta\lambda$=from 0.35 to 0.7, and particularly preferably by $\Delta\lambda$=from 0.4 to 0.6.

Mutual combination of one or more of the above measures is also possible if advantageous. Mutual combination of the two first measures has proven particularly advantageous here.

After the biaxial stretching process, it is preferable that one or both surfaces of the film is/are also corona- or flame-treated by one of the known methods. The treatment intensity is generally above 50 mN/m.

The inventive film exhibits very good handling, very good winding properties, and very good processing performance. It also features excellent cup-peel performance. In particular, the film has extremely little tendency toward tearing and tear-propagation and toward delamination. The inventive film is therefore suitable as a packaging material for foods and for other consumables, in particular as a lid film for food containers, such as yoghurt cups. The film also has excellent suitability for packaging of moisture- and/or air-sensitive foods and of other moisture- and/or air-sensitive consumable items which are likewise present in cups of this type.

The film of the present invention also has excellent optical properties, exhibits excellent further-processing properties, and has excellent roll-formation properties. The good handling of the film and its very good processing properties make it particularly suitable for processing on high-speed machines. The film also has excellent and impressive whiteness, which also gives it a very attractive appearance, effective for promotional purposes.

The table below (table 1) summarizes again the most important inventive film properties.

where RX, RY and RZ are corresponding reflectance factors using a X, Y or Z color measurement filter. The white standard used comprises a barium sulfate pressing (see in this connection DIN 5033, part 9). An example of a detailed description is found in Hansl Loos, Farbmessung [Color measurement], Verlag Beruf und Schule, Itzehoe (1989).

SV Value (Standard Viscosity)

Standard viscosity SV (DCA) is measured by a method based on DIN 53726, in dichloroacetic acid. Intrinsic viscosity (IV) is calculated as follows from standard viscosity $$IV=[\eta]=6.907 \cdot 10^{-4} SV\ (DCA+0.063096\ [dl/g]$$

TABLE 1

|   | Inventive range | Preferred | Particularly preferred | Unit | Test method |
|---|---|---|---|---|---|
| 1 R value | <43 | <42 | <40 | daN/mm² | as described |
| 2 $e_{max}$ ratio | <2.5 | <2.2 | <2.0 | — | as described |
| 3 Transparency | <60 | <55 | <50 | % | ASTM D1033-77 |
| 4 Whiteness | >60 | >65 | >70 | — | Berger method |
| 5 Thickness | 10–120 | 15–105 | 20–80 | μm |  |
| 6 Coefficient friction of coated side with respect to itself (COF) | <0.6 | <0.55 | <0.5 | — | DIN 53 375 |
| 7 Average roughness of coated side | <50 | <45 | <40 | nm | DIN 4768, cut-off of 0.25 mm |
| 8 Gloss (20° measurement angle) | >50 | >55 | >60 | — | DIN 67 530 |
| 9 Yellowness index | <50 | <45 | <40 | — | ASTM D1925-70 |
| 10 Filler concentration in base layer (white pigment) | >3 and <20 | >4 and <18 | >5 and <16 | % by wt. |  |
| 11 Pre-sterilization metal adhesion, adhesion to adhesives or to polymers applied by direct extrusion (average peel force) | >2.5 | >3.0 | >3.5 | N/25 mm | as described |
| 12 Post-sterilization metal adhesion, adhesion to adhesives or to polymers applied by direct extrusion (average peel force) | >2.0 | >2.5 | >3.0 | N/25 mm | as described |

The following test methods were utilized to characterize the polymers and the films:
DIN=Deutsches Institut für Normung [German Institute for Standardization]
ASTM=American Society for Testing and Materials Transparency Transparency is measured by a method based on ASTM D1033-77.

Yellowness Index

The Yellowness Index of the film is determined to ASTM D 1925-70 by means of a Lambda 12 spectrophotometer from Perkin Elmer (USA), standard D65 illuminant, 10° standard observer. The Yellowness Index YI is calculated by the equation $$YI=[100 \times (1.28 \times X - 1.06 \times Z)]/Y$$

from the standard color values X, Y and Z measured.

Whiteness

Whiteness is determined by the Berger method, generally by mutually superposing more than 20 layers of film. Whiteness is determined with the aid of the ELREPHO electrical reflectance photometer from Zeiss, Oberkochen (DE), standard illuminant C, 2° standard observer. Whiteness W is defined as $$W=RY+3RZ-3RX$$

Coefficient of Friction

Coefficient of friction is determined to DIN 53 375. Coefficient of sliding friction is measured 14 days after production.

Roughness

Roughness is determined to DIN 4768.

Gloss

Gloss is determined to DIN 67 530. Reflectance is measured, this being an optical parameter for the surface of a film. Using a method based on the standards ASTM D523-78 and ISO 2813, the incident angle is set at 20°. A light beam impacts the flat test surface at the set angle of incidence and is reflected or scattered by the surface. Light impacting the photoelectric detector is indicated in the form of a proportional electrical variable. The measured value is dimensionless and has to be stated together with the angle of incidence.

Determination of R Value

The R value of the film is measured in the middle of the film web.

Figure 1:
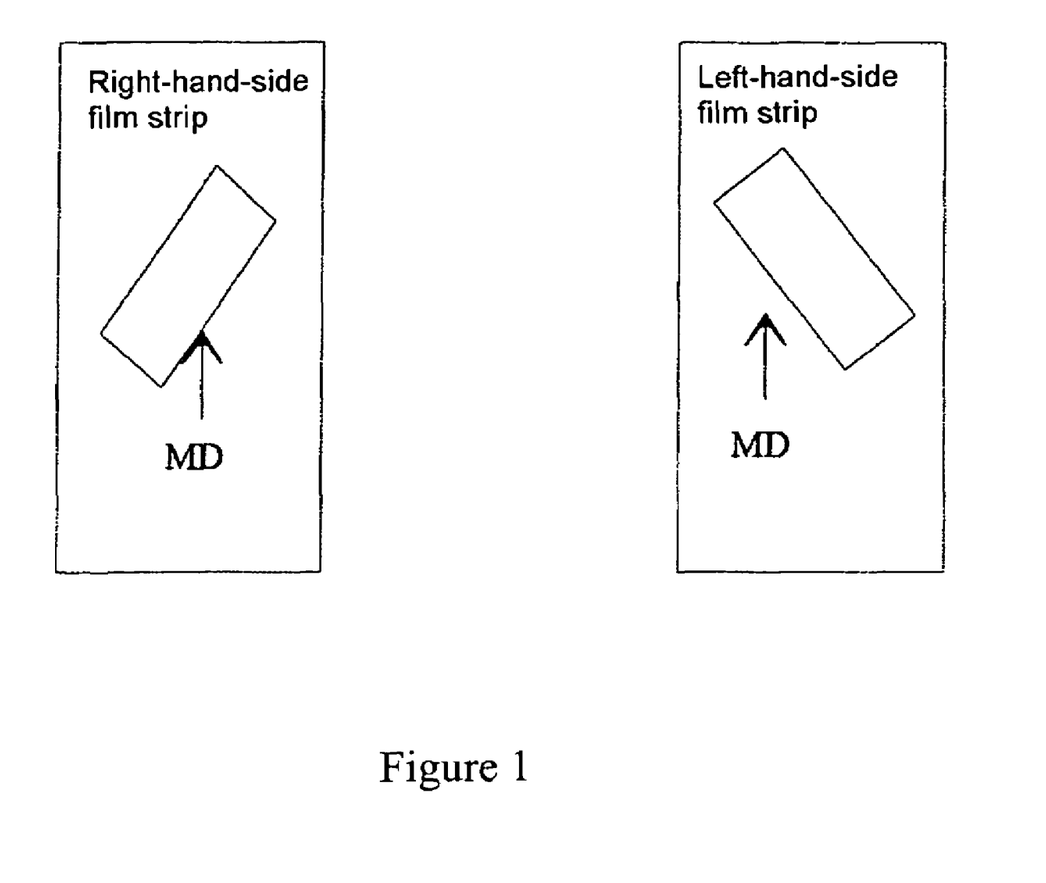
FIG. 1 is a schematic illustration of exemplary film strip orientations used in the determination of the R value.

As the diagram in FIG. 1 shows, two film strips of width 15 mm and length 200 mm (right-hand-side and left-hand-side film strip=Fr and Fl) are cut out for this purpose from the middle of the film web, each at an angle of 45° from MD, clamped into a tensile strain tester (Zwick, 010, Ulm, DE), and subjected to strain. Each R value is calculated on the basis of the following equation:

$$R\text{value}_{(Fl)} := \tfrac{1}{3} \times (\sigma_{30\%\ (Fl)} - \sigma_{0.2\%\ (Fl)})\, daN/mM^2$$

$$R\text{value}_{(Fr)} := \tfrac{1}{3} \times (\sigma_{30\%\ (Fr)} - \sigma_{0.2\%\ (Fr)})\, daN/mm^2$$

The variables $\sigma_{30\%}$ and $\sigma_{0.2\%}$ in this equation have the following meaning:

$\sigma_{30\%}$=tensile stress in the film at 30% strain, measured at 45° from MD of both specimens, $\sigma_{0.2\%}$=tensile stress in the film at 0.2% strain, measured at 45° from MD of both specimens, In the case of the inventive film, the R value is smaller than:

$$R\ \text{value} < 43\ daN/mm^2$$

both for the right-hand-side film strip and for the left-hand-side film strip

Determination of $e_{max}$ Ratio

The $e_{max}$ ratio is determined across the entire width of the film web (i.e. across the width of the machine roll). The distance between two measurement points (in TD=direction of width of film web) here is usually 50 cm. As in determination of the R value, here again two film strips of width 15 mm and length 200 mm (right-hand-side film strip and left-hand-side film strip=Fr and Fl) are cut out from the film web for each point of measurement, each at an angle of 45° from MD, the middle of the strips here determining the respective distance from the edge of the film web.

Figure 2:
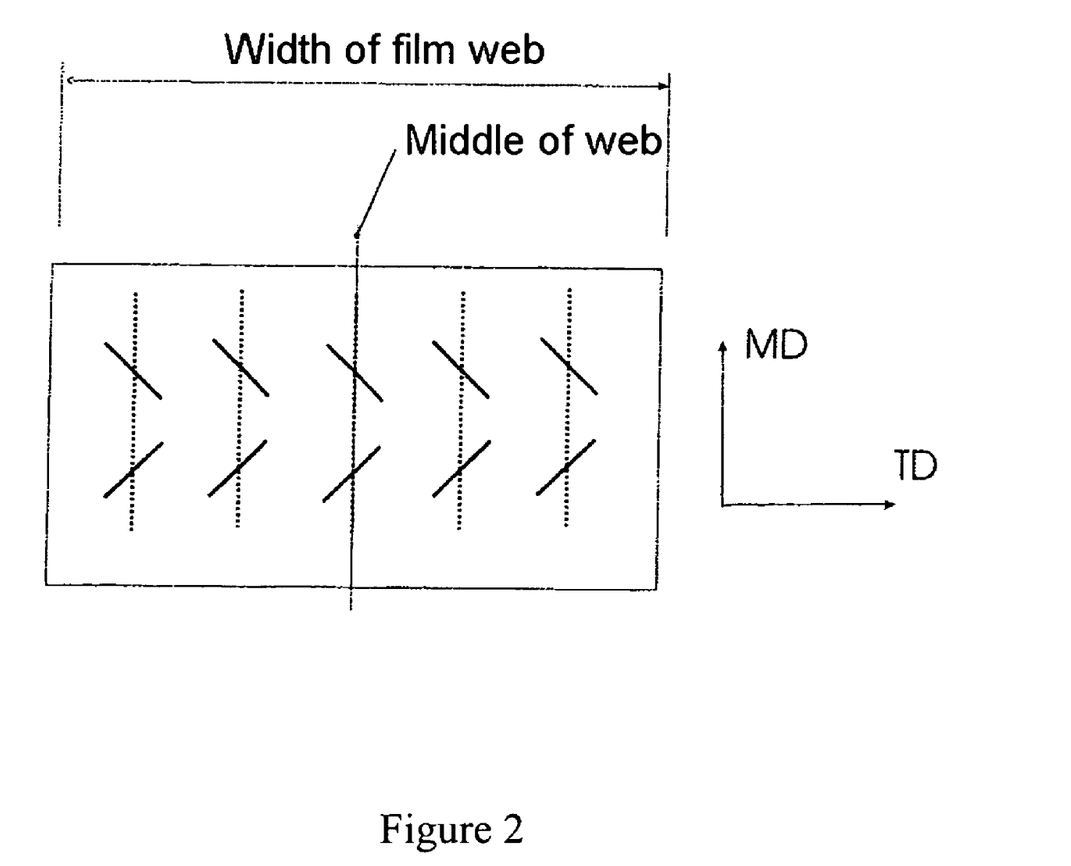
FIG. 2 is a schematic illustration of an exemplary sampling scheme used in determining the $e_{max}$ ratio.

The scheme for sampling for determining $e_{max}$ ratio is illustrated schematically in FIG. 2.

The $e_{max}$ ratio at the respective position on the film web is measured at an angle of 45° from MD, using the two specimens. In the middle of the film web, the $e_{max}$ ratio is approximately 1, and it increases as distance from the middle of the film web increases toward the edges of the film.

The samples of are then subjected to strain in a tensile strain tester, as described above for determination of R value. The $e_{max}$ ratio at the respective position on the film web is calculated on the basis of the following equation:

$$e_{max}\text{ratio}:=\epsilon_{Fl}/\epsilon_{Fr}\ \text{or}\ \epsilon_{Fr}/\epsilon_{Fl}$$

(which is defined as always>1), $\epsilon_{Fl}$ being the ultimate tensile strain of the film at 45° from MD, left-hand side, $\epsilon_{Fr}$ being the ultimate tensile strain of the film at 45° from MD, right-hand side.

By definition, the $e_{max}$ ratio is always greater than 1. When measurement is made across the width of the film web, the consequence is approximately that the first relationship $\epsilon_{Fl}/\epsilon_{Fr}$ applies for the first half of the web and the second relationship $\epsilon_{Fr}/\epsilon_{Fl}$ applies for the second half of the web. It has been found that the $e_{max}$ ratio is smaller than 2.5 at all positions across the width of the inventive film:

$$e_{max}\text{ratio}<2.5.$$

Assessment of Peel Performance of the Film from a Yoghurt Cup

The cup-peel performance of the film is determined visually. This test method adhesive-bonds the film (the lid) to the cup (an example of the sealing lacquer being ®Novacote) and peels it from the cup after a storage time (hardening time) of 48 hours. Peel performance is evaluated as ++(=good) if the film here neither tears nor delaminates:
−(=poor) if the film here tears and/or delaminates.

Adhesion to Adhesives, Metallic and Ceramic Layers, and Adhesion to Polymers Applied Via Direct Extrusion to the Coated Side Only measurement of adhesion to adhesives is described below. The other corresponding measurements are to be carried out similarly.

Prior to adhesive bonding, the specimen of film (300 mm long×180 mm wide) of the present invention is placed on a smooth piece of card (200 mm long×180 mm wide; weight about 400 g/m², bleached, outer layers coated). The two overlapping margins of the film (each 50 mm) are to be folded back onto the reverse side and secured with adhesive tape.

For adhesive bonding of the film according to the present invention, use is made of a standard polyester film of 12 μm thickness (e.g. ®Melinex 800), and a doctor device and doctor bar No. 3 from Erichsen, first applying about 1.5 ml of adhesive (Novacote NC 275+CA 12; mixing ratio: 4/1+7 parts of ethyl acetate) to the surface of the abovementioned film specimen. After aerating to remove the solvent, the standard polyester film of corresponding size is laminated to the adhesive-coated surface of the film specimen, using a metal roller (width 200 mm, diameter 90 mm, weight 10 kg, to DIN EN 20 535) the ends of the standard polyester film protruding by at least 50 mm. The lamination parameters are:

| | |
|---|---|
| Amount of adhesive: | 5 (+/−1) g/m² |
| Aeration after application of adhesive: | 4 min (+/−15 s) |
| Doctor thickness (Erichsen): | 3 |
| Doctor speed level: | about 133 mm/s |
| Bond curing time: | 2 h at 70° C. in a drying cabinet with air circulation |

A 25 (+/−1) mm strip cutter is used to take specimens about 100 mm in length, comprised of about 50 mm of composite and 50 mm of unbonded separate layers, these being needed for securing/clamping the test specimen. The test specimens are to be secured to a sheet metal support over the entire surface by means of double-sided adhesive tape, by way of the reverse side of the film of the present invention (base layer B or outer layer C). The sheet with the composite adhesively bonded thereto is to be clamped into the lower clamping jaw of the tensile test machine. The clamp separation is 100 mm. The unlaminated end of the standard polyester film, amounting to 50 mm, is to be clamped into the upper clamping jaw of the tensile test machine (e.g. Instron, Zwick) so that the resultant peel angle is 180°. The average peel force in N/25 mm is given (see table 1, No. 11 and 12), rounded to one decimal place.

| | |
|---|---|
| Specimen width: | 25 mm |
| Pretensioning force: | 0.1 N |
| Test length: | 25 mm |
| Separation rate until pretensioning force applied: | 25 mm/min |
| Start position: | 5 mm |
| Test displacement: | 40 mm |
| Sensitivity: | 0.01 N |
| Separation rate: | 100 mm/min |

The peel force test result is equivalent to the minimum adhesion between the layers, since the adhesion between the adhesive and the standard film is markedly greater.

Sterilizability

To determine sterilizability, the film is exposed to a steam jet at a temperature of about 100° C. for a period of 10 seconds. Adhesion is then determined as described above (see table 1, No. 12).

EXAMPLES

Example 1

N-2-(Aminoethyl)-3-aminopropyltrimethoxysilane (AE-APTMS) (supplied as Z-6020 from Dow Corning and as A-1120 from Union Carbide) was dispersed at a concentration of 2.0% by weight in customary tap water. For this, 5% strength acetic acid was added at a concentration of 0.2% by weight in order to facilitate hydrolysis.

Chips comprised of polyethylene terephthalate were dried at 160° C. to a residual moisture level below 50 ppm and fed to the extruder for the base layer B. A monoaxially oriented film was obtained via extrusion, followed by stepwise longitudinal orientation.

The longitudinally stretched film was corona-treated, using corona discharge equipment, and was then coated by the reverse gravure method with the hydrolyzed aminosilane solution prepared as described above.

The corona-treated, longitudinally stretched, coated film was dried at a temperature of about 110° C. The film was then stretched transversely with a stretching ratio of 3.8×1 in order to produce a biaxially oriented film. The thickness of the stretched film was 55 μm. The biaxially oriented film was then heat-set at a temperature of 230° C. The dry application weight of the coating was about 2.5 mg/m².

Base layer B:
85% by weight of polyethylene terephthalate with SV 800
15% by weight of PET masterbatch from Sukano (Schindellegi, CH), polyethylene terephthalate SV value 800, with 50% by weight of titanium dioxide (average particle diameter of titanium dioxide about 0.3 μm)

The production conditions in the individual steps of the process were:

| Longitudinal stretching | Stretching temperature: | 100° C. |
|---|---|---|
| | Longitudinal stretching ratio: | 3.4 |
| Transverse stretching | Stretching temperature: | 115° C. |
| | Transverse stretching ratio: | 3.8 |
| Setting | Temperature: | 230° C. |
| | Period: | 3 s |

A single-layer film was obtained with very good optical properties, with low coefficient of friction, with very good processing performance, and with very good winding quality. The film exhibited the desired behavior when peeled from the cup. The film does not tear during this process, and it exhibits no tendency to delaminate (table 2).

Example 2

Example 1 was repeated, but the process parameters were changed:

| Longitudinal stretching | Stretching temperature: | 120° C. |
|---|---|---|
| | Longitudinal stretching ratio: | 4.0 |
| Transverse stretching | Stretching temperature: | 110° C. |
| | Transverse stretching ratio: | 3.4 |
| Setting | Temperature: | 230° C. |
| | Period: | 3 s |

Under these conditions, too, a film was obtained with very good optical properties, with low coefficient of friction, with very good processing performance, and with very good winding quality. The film likewise exhibited the desired behavior on peeling from the cup. The film does not tear during this process, and it exhibits no tendency to delaminate.

Example 3

Example 1 was repeated, but the thickness of the film was reduced from 55 to 36 μm. This comparatively thin film, too, has good processing performance, very good winding quality, and the desired performance when the film is peeled from the cup.

Comparative Example 1

Example 1 was repeated, but the process conditions were changed:

| Longitudinal stretching | Stretching temperature: | 118° C. |
|---|---|---|
| | Longitudinal stretching ratio: | 4.3 |
| Transverse stretching | Stretching temperature: | 110° C. |
| | Transverse stretching ratio: | 4.2 |
| Setting | Temperature: | 230° C. |
| | Period: | 3 s |

The film did not exhibit the desired processing performance and in particular did not exhibit the desired performance when the film was peeled from the cup. The film tears and exhibited a high tendency to delaminate.

Comparative Example 2

Example 1 was repeated, but the film was not coated. The film did not exhibit the desired processing performance, but exhibited inadequate adhesion to adhesives, did not exhibit the desired steam-sterilizability, and did not have the required high winding quality.

The results of the inventive/comparative examples are summarized in table 2.

TABLE 2

| Examples | Film thickness μm | Film web width m | R value daN/mm² | $e_{max}$ ratio | Coefficient of friction of the two surfaces with respect to one another | Roughness of the two surfaces nm | Transparency % | Whiteness | Gloss of the two surfaces | Yellowness index | Adhesion prior to/after sterilization | Peel performance |
|---|---|---|---|---|---|---|---|---|---|---|---|---|
| 1 | 55 | 5 | 39 | 1.8 | 0.55 | 28 | 28 | 90 | 72 | 36 | 4.0/3.5 | ++ |
| 2 | 55 | 5 | 37 | 1.7 | 0.556 | 30 | 30 | 90 | 73 | 34 | 4.2/3.4 | ++ |
| 3 | 36 | 5 | 38 | 1.8 | 0.56 | 31 | 35 | 88 | 70 | 30 | 4.1/3.5 | ++ |
| CE1 | 55 | 5 | 51 | 2.7 | 0.356 | 30 | 28 | 90 | 72 | 36 | 4.2/3.4 | − |
| CE2 | 55 | 5 | 39 | 1.7 | 0.49 | 32 | 28 | 90 | 72 | 36 | 2.2/1.5 | − |

Peel performance
++ very good
+ good
− moderate
−− poor
CE = comparative example

The invention claimed is:

1. A single- or multilayer, white, biaxially oriented polyester film comprising thermoplastic polyester and pigment and a coating on at least one side, wherein
   a) the R value of the film is smaller than 43 daN/mm²,
   b) the $e_{max}$ ratio of the film is smaller than 2.5, and
   c) the coating on one or both surface(s) of the film is an adhesion-promoting, steam-sterilization-resistant layer comprised of a hydrolyzed amino-functional silane and
   d) the coated surface(s) of said film has an average surface roughness of less than 50 mm and exhibits a coefficient of friction with respect to itself of less than 0.6.

2. The polyester film as claimed in claim 1, which is a single-layer film.

3. The polyester film as claimed in claim 1, which has a symmetrical layer structure ABA or ACBCA, where C are the intermediate layers and A are the outer layers of the film.

4. The polyester film as claimed in claim 3, wherein the layer B comprises at least 80% by weight of the thermoplastic polyester, based on the total weight of the layer.

5. The polyester film as claimed in claim 3, wherein the polyester used for the layer B comprises polyethylene terephthalate.

6. The polyester film as claimed in claim 3, wherein only the layer B of the film has a white pigment or filler.

7. The polyester film as claimed in claim 1, wherein the R value of the film is smaller than 42 daN/mm² and the $e_{max}$ ratio of the film is smaller than 2.2.

8. The polyester film as claimed in claim 1, wherein the polyester contains units derived from ethylene glycol and terephthalic acid, and/or units derived from ethylene glycol and naphthalene-2,6-dicarboxylic acid.

9. The polyester film as claimed in claim 1, which further comprises $TiO_2$ as white pigment or filler.

10. The polyester film as claimed in claim 9, which comprises more than 3% by weight of the white pigment, based on the total weight of the layer in which it is present.

11. The polyester film as claimed in claim 1, wherein the adhesion-promoting layer is comprised of a dried residue of a hydrolyzed aminosilane compound whose unhydrolyzed form has the formula where $R^1$ is a functional group having at least one primary amino group, $R^2$ is a hydrolyzable group, selected from a short-chain alkoxy group having 1 to 8 carbon atoms, from an acetoxy group, or from halide, and $R^3$ is an unreactive, non-hydrolyzable group, selected from a short-chain alkyl group having from 1 to 8 carbon atoms or from a phenyl group; where a is greater than or equal to 1; b is greater than or equal to 1; c is greater than or equal to 0, and a+b+c=4.

12. The polyester film as claimed in claim 1, whose total thickness is from 10 to 120 μm.

13. The polyester film as claimed in claim 1, whose yellowness index is less than 50.

14. A process for the production of a polyester film as claimed in claim 1, comprising the steps of
   a) producing a single- or multilayer film via extrusion or coextrusion and shaping the melts to give flat melt films,
   b) coating of the film with a water-soluble adhesion-promoting coating,
   c) biaxially stretching the film in the machine direction and the transverse direction, and
   d) heat-setting the stretched film,
where the coating process takes place prior to, during, or after the biaxial stretching process.

15. The process as claimed in claim 14, wherein, in order to achieve the desired R value or $e_{max}$ ratio of the film, the stretching temperatures are increased and/or the stretching ratio in the longitudinal and/or transverse direction is lowered.

16. The process as claimed in claim 14, wherein the longitudinal stretching temperature is from 80 to 130° C., the transverse stretching temperature is from 80 to 135° C., and the longitudinal stretching ratio is from 2.5 to 4.0, and the transverse stretching ratio is from 3.5 to 4.0.

17. The process as claimed in claim 14, wherein the water-soluble, adhesion-promoting coating is applied in the form of an aqueous dispersion to one or both surfaces of the film.

18. The process as claimed in claim 14, wherein, prior to the transverse stretching process, one or both surface(s) of the film is/are coated with the water-soluble adhesion-promoting and steam-sterilizable layer.

19. The process as claimed in claim 14, wherein the coating is applied in the form of an aqueous dispersion.

20. Packaging film for foods and for other consumable items comprising film according to claim 1.

21. Packaging film as claimed in claim 20 wherein said film is lid film for cup-shaped containers.

* * * * *